United States Patent [19]

Ahn

[11] Patent Number: 5,725,171
[45] Date of Patent: Mar. 10, 1998

[54] VCR HAVING A REEL BRAKE DEVICE

[75] Inventor: Seong-Ick Ahn, Seoul, Rep. of Korea

[73] Assignee: Daewoo Electronics Co., Ltd., Seoul, Rep. of Korea

[21] Appl. No.: 719,030

[22] Filed: Sep. 24, 1996

[30] Foreign Application Priority Data

Sep. 29, 1995 [KR] Rep. of Korea ............ 95-26991

[51] Int. Cl.⁶ .................................................. G11B 15/48
[52] U.S. Cl. .................................................. 242/355.1
[58] Field of Search ................ 242/355, 355.1, 242/355.2; 360/85, 95, 96.3, 96.4, 96.5

[56] References Cited

U.S. PATENT DOCUMENTS

| | | | |
|---|---|---|---|
| 5,358,195 | 10/1994 | Kang | 242/355.1 |
| 5,398,882 | 3/1995 | Kim | 242/355.1 |
| 5,465,921 | 11/1995 | Cheon | 242/355.1 |
| 5,511,737 | 4/1996 | Kang et al. | 242/355.1 |

*Primary Examiner*—John P. Darling
*Attorney, Agent, or Firm*—Beveridge, DeGrandi, Weilacher & Young LLP

[57] ABSTRACT

A VCR having a reel brake device is formed with plural friction projections arranged along the outer circumference of a reel table at a regular interval and plural correspondent projections having the identical pitch on a felt surface of a brake member closely attached to the friction projections. Once the brake is to be applied in a released state, the VCR produces a secure braking force by a frictional force between the friction projections and correspondent projections to prevent slack of a tape and degradation of picture quality.

7 Claims, 4 Drawing Sheets

5,725,171

VCR HAVING A REEL BRAKE DEVICE

BACKGROUND OF THE INVENTION

1. Field of the Invention

The present invention relates to a reel brake device utilized into a video cassette recorder (VCR), and more particularly to a VCR having a reel brake device formed with a plurality of friction projections along a circumferential friction plane of a reel table and correspondent projections having a pitch identical to that of the friction projections along a friction plane of a brake member.

2. Description of the Prior Art

Generally, a reel brake device is installed to the interior of a VCR for stopping the travelling of a tape when a play mode of the tape is shifted into a stop mode or rewind mode.

FIGS. 1, 2 and 3 illustrate such a conventional reel brake device.

More specifically, FIG. 1 is a plan view schematically showing a state of operating the reel brake device to be on, and FIG. 2 is a plan view schematically showing a state of releasing the brake shown in FIG. 1. As illustrated in FIGS. 1 and 2, the reel brake device of the VCR largely includes a reel table 10, a reel brake 30 and a deck 1 for settling reel table 10 and reel brake 30.

Reel table 10 is formed with a reel portion 18 rotated by being wound with a tape at the center thereof, and a gear portion 16 for transmitting the rotating force to reel table 10 at the outermost periphery thereof. A friction portion 12 serving as a friction brake is formed between reel portion 18 and gear portion 16 to provide a structure that reel portion 18, friction portion 12 and gear portion 16 are rotated altogether.

Friction portion 12 has a reel-table friction plane 14 consistently formed along a circumferential plane while having a predetermined height.

Reel brake 30 is installed to be adjacent to reel table 10, which includes a brake member 36, a hinge shaft 38, an operating boss 34, a spring 42 and a felt 32. Hinge shaft 38 is fitted into a predetermined portion of brake member 36 to allow brake member 36 to swing about hinge shaft 38 by as many as a predetermined angle. Also, operating boss 34 is fitted into brake member 36 spaced apart from hinge shaft 38 by a predetermined distance.

One end of spring 42 is connected to one end of brake member 36, and the other end thereof is fixed to deck 1. Flat-type felt 32 is installed where brake member 36 is in contact with reel-table friction plane 14. A reference numeral 3 labelled onto deck 1 denotes a hole formed in deck 1.

FIG. 3 is a front view of the reel brake device shown in FIG. 1. As shown in FIG. 3, reel portion 18 is formed over reel table 10 to have a predetermined height from the center of reel table 10, and friction portion 12 having a diameter larger than that of reel portion 18 is formed to the lower end thereof. Felt 32 is installed to contact reel-table friction plane 14 of friction portion 12 while performing the swing motion thereof. FIG. 3 illustrates a state that felt 32 is closely attached to reel-table friction plane 14 to stop reel table 10. Gear portion 16 having a larger diameter than friction portion 12 is integrally formed to the lower end of friction portion 12.

The VCR having the above-described conventional reel brake device is operated as below.

When the mode of the tape is to be shifted from a play mode or fast forward mode into another mode (e.g., rewind mode or stop mode), that is, when a travelling speed of the tape is to be changed, a user operates a stop switch (not shown) or rewind switch (not shown). Then, operating boss 34 releases reel brake 30 so as to make reel brake 30 under a release state go to a braking state. By doing so, brake member 36 swings about hinge shaft 38 due to a restoring force of spring 42. Consequently, felt 32 becomes closely attached to reel-table friction plane 14, and the closely attached felt 32 decelerates the rotating speed of reel table 10 to a stop. Then, the mode is shifted into another mode by a controlling section (not shown).

Meanwhile, reel brake 30 is to be released from the applying state, the controlling section operates operating boss 34 to swing brake member 36.

In other words, once operating boss 34 swings brake member 36 while overcoming the elastic force of spring 42, felt 32 becomes distant from reel-table friction plane 14 to attain the brake releasing state.

However, the VCR having the conventional reel brake device operated as above is disadvantageous in that the surface of reel-table friction plane 14 is too smooth to adequately apply the braking force between felt 32 and reel-table friction plane 14. Due to this fact, reel table 10 is not promptly stopped to slack the tape, degrade picture quality, shorten durability of the tape, etc.

SUMMARY OF THE INVENTION

It is an object of the present invention to provide a VCR having a reel brake device, wherein, in order to solve the foregoing problems, a plurality of projections are formed onto a surface where a reel table contacts with a brake member for stopping a tape with a secured braking force within a short time to prevent the tape from being slacken and damaged.

To achieve the above object of the present invention, a VCR having a reel brake device includes a reel table formed with friction projections along a circumferential plane thereof. Also, a brake member formed with correspondent projections on a friction plane in contact with the friction projections can swing about a hinge shaft by a predetermined angle toward the friction projections, and a part controls the swinging angle of the brake member.

Preferably, the friction projections have sections consistent in the linear axial direction of the reel table, are formed in plural by being spaced apart from one another by a predetermined interval in the circumferential direction of the reel table, and the section is shaped as a rectangle.

It is preferable that the correspondent projections are formed in plural by being spaced apart from one another by a predetermined interval, and hemispherically shaped.

More preferably, a pitch of the friction projections is identical to a pitch of the correspondent projections.

Here, the controlling part includes an elastic body installed to one end of the brake member for closely attaching the brake member to the friction projections, and an operating boss for separating the braking member from the friction projections while overcoming an elastic force of the elastic body. The elastic body may be a spring having one end fixed to a deck installed with the reel table and the other end fixed to one end of the brake member.

As an alternative aspect of the present invention, a VCR having a reel brake device includes a reel table formed with a plurality of friction projections which are spaced apart from one another by a predetermined interval in the circumferential direction along a circumferential plane thereof while having sections consistent in the linear axial direction. In addition, a brake member capable of swinging about a hinge shaft by a predetermined angle toward the friction projections are formed with a plurality of hemispherically-shaped correspondent projections on a friction plane in contact with the friction projections to have a pitch identical to that of the friction projections. A spring has one end fixed to a deck installed with the reel table, and the other end is fixed to one end of the brake member for closely attaching the brake member to the friction projections. An operating boss separates the braking member from the friction projections while overcoming an elastic force of the spring.

In the VCR having the reel brake device according to the present invention constructed as above, the brake member swings about the hinge shaft while the operating boss is released. Along with the swinging of the brake member, the correspondent projections of the friction plane are closely attached to the friction projections of the friction portion. Thus, the reel table is applied with a braking force over that of the conventional technique.

Furthermore, the VCR having the reel brake device according to the present invention constructed as above exerts the secure braking force upon the reel brake to prevent the slack of the tape while promptly stopping the tape, thereby lengthening the life of the tape and involving no degradation of the picture quality.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A VCR having a reel brake device according to the present invention will be described in detail with reference to the preferred embodiment illustrated in the accompanying drawings.

Figure 1:
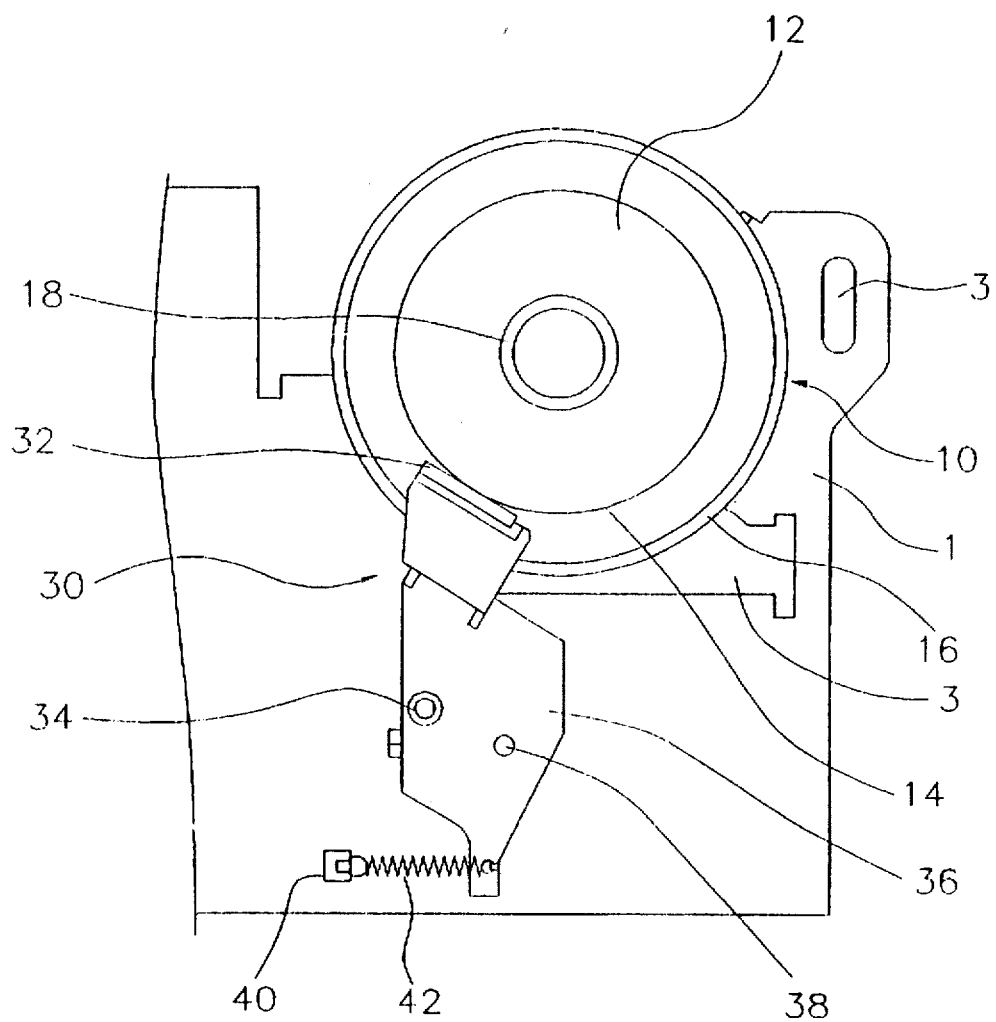
FIG. 1 is a plan view schematically showing a state of applying a brake in a conventional reel brake device of a VCR.
Figure 2:
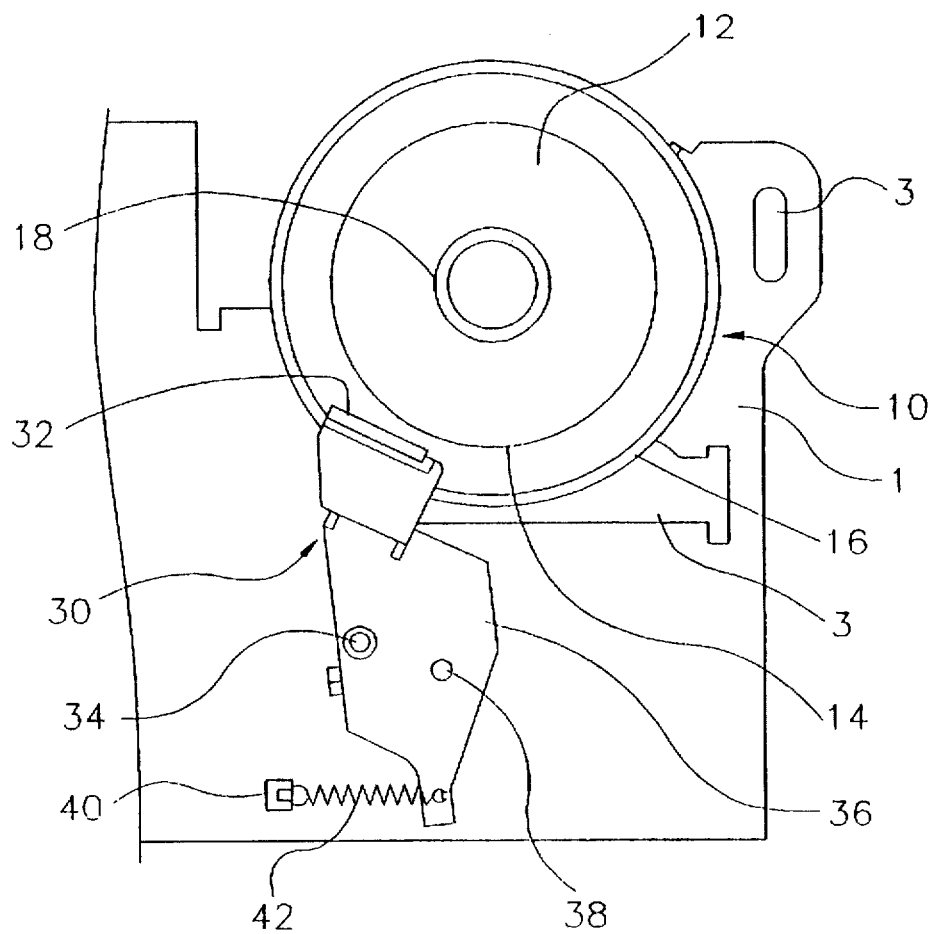
FIG. 2 is a plan view schematically showing a state that the brake of FIG. 1 is released.
Figure 3:
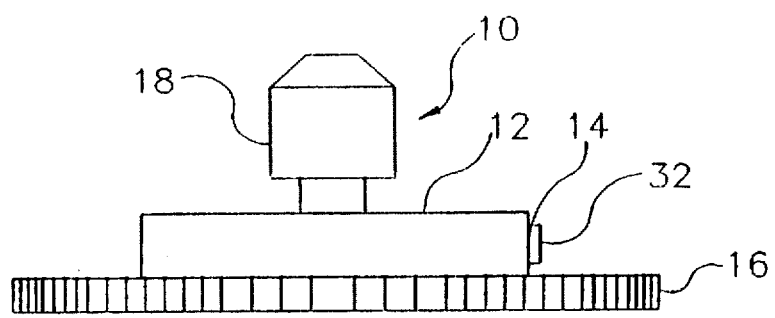
FIG. 3 is a front view of the reel brake device shown in FIG. 1.
Figure 4:
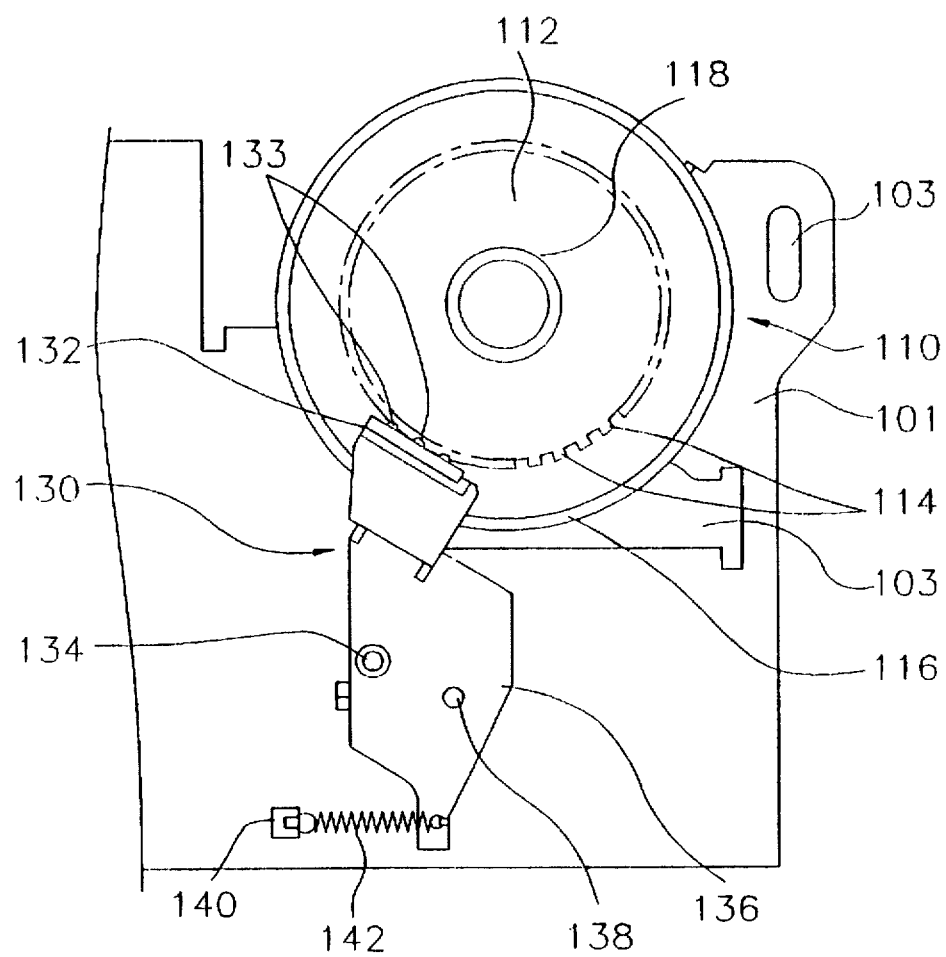
FIG. 4 is a plan view schematically showing a state of applying a brake in a VCR having a reel brake device according to the present invention.
Figure 5:
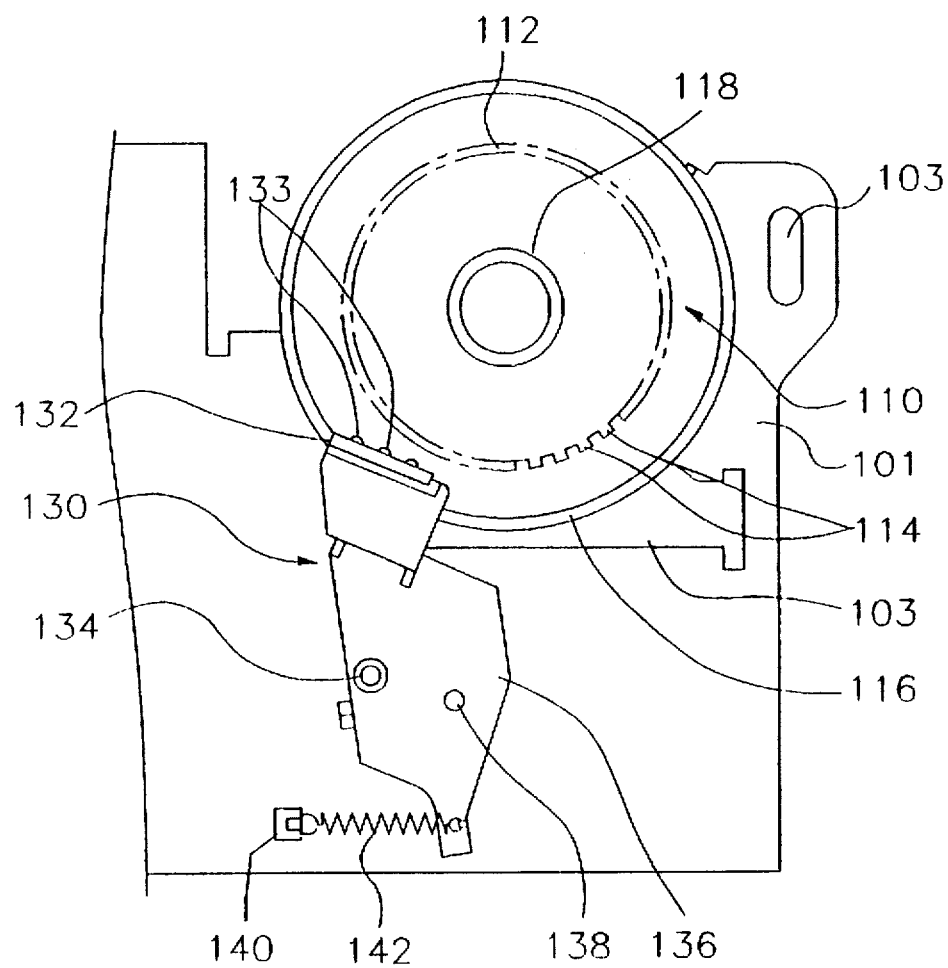
FIG. 5 is a plan view schematically showing a state of releasing the brake shown in FIG. 4.

FIG. 4 is a plan view schematically showing a state of applying a brake in the VCR having the reel brake device according to the present invention, and FIG. 5 is a plan view schematically showing a state of releasing the brake shown in FIG. 4. As is illustrated in FIGS. 4 and 5, the reel brake device according to the present invention largely has a reel table 110, a reel brake 130 and a deck 101 for settling reel table 110 and reel brake 130.

Reel table 110 is formed with a reel portion 118 rotated by being wound with a tape at the center thereof, and a gear portion 116 for transmitting the rotating force to reel table 110 at the outermost periphery thereof. A friction portion 112 serving as a friction brake is formed between reel portion 118 and gear portion 116 to provide a structure that reel portion 118, friction portion 112 and gear portion 116 are rotated altogether.

A plurality of friction projections 114 are formed along the circumferential plane of friction portion 112 spaced from one another at regular intervals. Friction projections 114 are shaped to have rectangular sections in the linear axial direction of the rotating shaft of reel table 110, so that overall appearance is similar to a rectangular gear. Friction projection 114 may have a section of a trapezoidal or triangular shape in another embodiment, and a predetermined curvature may be provided at the edge portion of friction projection 114 for facilitating the processing and reducing noise.

Reel brake 130 is installed adjacent to reel table 110, which includes a brake member 136, a hinge shaft 138, an operating boss 134, a spring 142 and correspondent projections 133. Hinge shaft 138 is fitted into a predetermined portion of brake member 136 to allow brake member 136 to swing about hinge shaft 138 by as many as a predetermined angle. Also, operating boss 134 is fitted into brake member 136 spaced apart from hinge shaft 138 by a predetermined distance to confine the swing motion of brake member 136.

In association with brake member 136, a friction plane 132 formed of a felt is installed to a portion in contact with friction projections 114 of reel table 110, and plurality of correspondent projections 133 protrude from friction plane 132.

Respective correspondent projections 133 are hemispherically shaped, and an interval between correspondent projections 133, i.e., a pitch, is identical to the pitch of friction projections 114. Additionally, although correspondent projections 133 are arranged in a single row, it is possible to contrive a matrix arrangement of at least two rows for obtaining a required braking force.

Spring 142 for connecting deck 101 and brake member 136 is installed to an opposite end of friction plane 132 centering about hinge shaft 138. One end of spring 142 is connected to one end of brake member 136, and the other end thereof is fixed to deck 101. A reference numeral 103 labelled onto deck 101 denotes a hole formed in deck 101, and 140 is a bracket fixed to deck 101.

Figure 6:
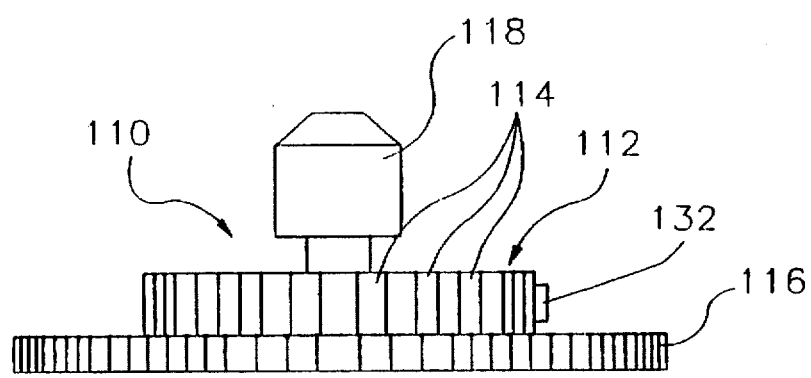
FIG. 6 is a front view showing the reel brake device shown in FIG. 4.

FIG. 6 is a front view in a state of applying the reel brake device shown in FIG. 4. As shown in FIG. 6, in a partial view, cylindrical reel portion 118 is formed over reel table 110 to have a predetermined height from the center of reel table 110, and friction portion 112 having a diameter larger than that of reel portion 118 is formed to the lower end thereof. Plurality of friction projections 114 are arranged along the circumferential plane of friction portion 112 at the regular interval from one another, and correspondent projections 133 of friction plane 132 are meshed into gaps provided friction projections 114. Gear portion 116 having a larger diameter than friction portion 112 is integrally formed to the lower end of friction portion 112.

The operation and effect of the VCR having the reel brake device according to the present invention constructed as above will be described hereinbelow.

When the mode of the tape is to be shifted from a play mode or fast forward mode into another mode (e.g., rewind mode or stop mode), that is, when a travelling speed of the tape is to be changed, a user operates a stop switch (not shown) or rewind switch (not shown). Then, operating boss 134 releases reel brake 130 so as to make reel brake 130 under a release state go to a braking state. By doing so, brake member 136 swings about hinge shaft 138 due to a restoring force of spring 142. Consequently, friction plane 132 and correspondent projections 133 formed along friction plane 132 become in contact with friction projections 114. As correspondent projections 133 are closely attached to correspondent projections 133 by the elastic force of spring 142, the larger braking force is imposed upon reel table 110. Finally, reel table 110 is completely stopped, and a controlling section (not shown) shifts the operational mode to another mode.

Meanwhile, reel brake 130 is to be released from the braking state, the controlling section operates operating boss 134 to swing brake member 136. In other words, once operating boss 134 swings brake member 136 while overcoming the elastic force of spring 142, friction plane 132 and correspondent projections 133 become distant from friction projections 114 to attain the brake releasing state.

As a result, since a secure braking force is exerted upon the reel brake, the slack of the tape can be prevented. Thus, the VCR having the reel brake device according to the present invention is effective in lengthening the life of the tape and inhibiting the degradation of the picture quality.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A VCR having a reel brake device comprising:
   a reel table formed with a reel portion rotated by being wound with a tape at the center thereof, a gear portion for transmitting a rotating force to said reel table at the outermost periphery thereof, and a friction portion formed between said reel portion and said gear portion to provide a structure that said reel portion, said friction portion, and said gear portion are rotated together, wherein the friction portion is formed with friction projections along a circumferential plane thereof;
   a brake member capable of swinging about a hinge shaft by a predetermined angle toward said friction projections, and being formed with correspondent projections on a friction plane in contact with said friction projections; and
   means for controlling the swinging angle of said brake member.

2. A VCR having a reel brake device as claimed in claim 1, wherein said friction projections have sections consistent in the linear axial direction of said reel table, and are formed in plural by being spaced apart from one another by a predetermined interval in the circumferential direction of said reel table.

3. A VCR having a reel brake device as claimed in claim 1, wherein said correspondent projections are formed in plural by being spaced apart from one another by a predetermined interval.

4. A VCR having a reel brake device as claimed in claim 1, wherein said controlling means comprises:

an elastic body installed to one end of said brake member for closely attaching said brake member to said friction projections; and
   an operating boss for separating said braking member from said friction projections while overcoming an elastic force of said elastic body.

5. A VCR having a reel brake device as claimed in claim 4, wherein said elastic body is comprised of a spring having one end fixed to a deck installed with said reel table and the other end fixed to one end of said brake member.

6. A VCR having a reel brake device comprising:
   a reel table formed with a plurality of friction projections spaced apart from one another by a predetermined interval in the circumferential direction along a circumferential plane thereof while having sections consistent in the linear axial direction, wherein surfaces of said friction projections are made of felt;
   a brake member capable of swinging about a hinge shaft by a predetermined angle toward said friction projections, and being formed with a plurality of hemispherically-shaped correspondent projections on a friction plane in contact with said friction projections to have a pitch identical to that of said friction projections;
   a spring having one end fixed to a deck installed with said reel table and the other end fixed to one end of said brake member for closely attaching said brake member to said friction projections; and
   an operating boss for separating said braking member from said friction projections while overcoming an elastic force of said spring.

7. A VCR having a reel brake device comprising:
   a reel table formed with a reel portion rotated by being wound with a tape at the center thereof, a gear portion for transmitting the rotating force to said reel table at the outermost periphery thereof, and a friction portion formed between said reel portion and said gear portion to provide a structure that said reel portion, said friction portion, and said gear portion are rotated together, wherein said friction portion is formed with a plurality of friction projections spaced apart from one another by a predetermined interval in the circumferential direction along a circumferential plane thereof while having sections consistent in the linear axial direction, wherein surfaces of said friction projections are made of felt;
   a brake member capable of swinging about a hinge shaft by a predetermined angle toward said friction projections, and being formed with a plurality of hemispherically-shaped correspondent projections on a friction plane in contact with said friction projections to have a pitch identical to that of said friction projections;
   a spring having one end fixed to a deck installed with said reel table and the other end fixed to one end of said brake member for closely attaching said brake member to said friction projections; and
   an operating boss for separating said braking member from said friction projections while overcoming an elastic force of said spring.

* * * * *